United States Patent
Fujita et al.

(10) Patent No.: US 10,644,359 B2
(45) Date of Patent: May 5, 2020

(54) STORAGE BATTERY CONTROLLING DEVICE, CONTROLLING METHOD, NON-TRANSITORY COMPUTER READABLE MEDIUM, POWER STORAGE SYSTEM, AND POWER SYSTEM

(71) Applicant: KABUSHIKI KAISHA TOSHIBA, Tokyo (JP)

(72) Inventors: Yumi Fujita, Tokyo (JP); Tomokazu Morita, Chiba (JP); Ena Ishii, Kanagawa (JP); Nobukatsu Sugiyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 15/692,717

(22) Filed: Aug. 31, 2017

(65) Prior Publication Data

US 2018/0006335 A1   Jan. 4, 2018

Related U.S. Application Data

(63) Continuation of application No. PCT/JP2015/076141, filed on Sep. 15, 2015.

(51) Int. Cl.
*H01M 10/42* (2006.01)
*H01M 10/44* (2006.01)
(Continued)

(52) U.S. Cl.
CPC ......... *H01M 10/425* (2013.01); *H01M 10/44* (2013.01); *H01M 10/446* (2013.01);
(Continued)

(58) Field of Classification Search
None
See application file for complete search history.

(56) References Cited

U.S. PATENT DOCUMENTS

| 6,075,346 A | 6/2000 | Kikuchi et al. |
| 6,563,318 B2 | 5/2003 | Kawakami et al. |

(Continued)

FOREIGN PATENT DOCUMENTS

| CN | 100529787 C | 8/2009 |
| EP | 2 762 908 A1 | 8/2014 |

(Continued)

OTHER PUBLICATIONS

Dambrowski, Review on Methods of State-of-Charge Estimation with Viewpoint to the Modern LiFePO4/Li4Ti5O12 Lithium Ion Systems, INTELEC 2013—The 35 Interational Telecommunication Energy Conference, Oct. 2013, p. 1-6 (Year: 2013).*

(Continued)

*Primary Examiner* — Roy Y Yi
(74) *Attorney, Agent, or Firm* — Finnegan, Henderson, Farabow, Garrett & Dunner, L.L.P.

(57) ABSTRACT

A storage battery controlling device according to an embodiment of the present invention includes: a battery characteristic estimator configured to calculate an internal resistance of a secondary battery and a function indicating relationship between an open circuit voltage of the secondary battery and a state of charge or an amount of a charge charged of the secondary battery therein, on the basis of data of a temperature, a voltage and a current of the secondary battery which are measured in charging or discharging the secondary battery; and an input/output performance value calculator configured to calculate an inputtable/outputtable power amount of the secondary battery on the basis of the internal resistance and the function calculated by the battery characteristic estimator.

10 Claims, 10 Drawing Sheets

(51) Int. Cl.
*H02J 7/00* (2006.01)
*H01M 10/48* (2006.01)

(52) U.S. Cl.
CPC ............... *H01M 10/48* (2013.01); *H02J 7/00* (2013.01); *H02J 7/0021* (2013.01); *H01M 2010/4271* (2013.01); *H01M 2010/4278* (2013.01); *H02J 7/0048* (2020.01)

(56) References Cited

U.S. PATENT DOCUMENTS

| | | | |
|---|---|---|---|
| 7,564,221 | B2 | 7/2009 | Asai et al. |
| 8,336,651 | B2 | 12/2012 | Nishi et al. |
| 8,820,445 | B2 | 9/2014 | Kikuchi |
| 9,213,070 | B2 | 12/2015 | Hoshino et al. |
| 9,685,807 | B2 | 6/2017 | Nakao et al. |
| 9,726,763 | B2 * | 8/2017 | Dempsey ................ G01S 17/89 |
| 2007/0145953 | A1 | 6/2007 | Asai et al. |
| 2014/0222358 | A1 | 8/2014 | Morita et al. |
| 2015/0268306 | A1 * | 9/2015 | Sugiyama ............ G01R 31/367 702/63 |
| 2015/0357852 | A1 | 12/2015 | Nakao et al. |
| 2016/0327613 | A1 | 11/2016 | Tenmyo et al. |

FOREIGN PATENT DOCUMENTS

| | | |
|---|---|---|
| JP | 11-187577 | 7/1999 |
| JP | 2000-147075 | 5/2000 |
| JP | 2002-58113 | 2/2002 |
| JP | 2004-357377 | 12/2004 |
| JP | 2007-306771 | 11/2007 |
| JP | 2008-42960 | 2/2008 |
| JP | 2012-13472 | 1/2012 |
| JP | 2012-135114 | 7/2012 |
| JP | 2012-251806 | 12/2012 |
| JP | 2013-110912 | 6/2013 |
| JP | 2013-183509 | 9/2013 |
| JP | 2014-0064362 | 4/2014 |
| JP | 2014-149280 A | 8/2014 |
| JP | 2014-196985 A | 10/2014 |
| WO | WO 2015/115044 A1 | 8/2015 |

OTHER PUBLICATIONS

International Search Report from the Japanese Patent Office for International Application No. PCT/JP2015/076141, dated Dec. 15, 2015.

International Report on Patentability and Written Opinion issued by the International Bureau of WIPO dated Mar. 29, 2018, for International Application No. PCT/JP2015/076141.

* cited by examiner

STORAGE BATTERY CONTROLLING DEVICE, CONTROLLING METHOD, NON-TRANSITORY COMPUTER READABLE MEDIUM, POWER STORAGE SYSTEM, AND POWER SYSTEM

CROSS-REFERENCE TO RELATED APPLICATION (S)

This application is a Continuation of International Application No. PCT/JP2015/076141, filed on Sep. 15, 2015, the entire contents of which is hereby incorporated by reference.

FIELD

Embodiments described herein relate generally to a storage battery controlling device, a controlling method, a non-transitory computer readable medium, a power storage system, and a power system.

BACKGROUND

In accordance with the Electricity Business Act, a power producer and supplier (PPS) is requested to match a used power amount and a supplied power amount (simultaneous commensuration) on a 30-minute basis. Nevertheless, even for the 30-minute basis, it is difficult for a power producer and supplier to completely achieve the simultaneous commensuration, and some excess or shortage possibly arises. When such an excess or shortage arises, the local electric power company supplements the shortage or absorbs the excess. When having supplemented the shortage, the electric power company asks the power producer and supplier for an "imbalance rate". Therefore, in order to adjust the supply amount, the power producer and supplier has a power storage system so as to achieve the simultaneous commensuration.

When using the power storage system, it is important to predict a chargeable or dischargeable electricity amount (amount of a charge) or power amount of a storage battery in the power storage system at any time point. Incorrect prediction results in a difficulty in fluctuation suppression and peak shift to be achieved, which can cause the imbalance rate. Therefore, a charge/discharge amount prediction system is used. The charge/discharge amount prediction system is used, other than for the power storage system, also for power generation using natural energy such as solar power generation and wind power generation, and power generation using an electric vehicle, a hybrid electric vehicle and the like.

The chargeable/dischargeable electricity amount of a secondary battery largely changes due to environmental temperature, deterioration over time and the like. Therefore, in general, a state of charge (SOC) of the secondary battery, a temperature of the secondary battery, and the like are set as parameters, a standard chargeable/dischargeable maximum power value under the parameters is experimentally obtained, and it is beforehand listed in a table as a characteristic value table. A charge/discharge power value with arbitrary parameters has been predicted on the basis of this characteristic value table.

However, since prediction of the charge/discharge power value as above is based on a standard across-the-board characteristic value table, characteristic variation among individual secondary batteries and characteristic deterioration advancing over time cannot be dynamically handled, which causes a large error in charge/discharge power prediction value. Therefore, the prediction value is to be estimated to be small in order to secure an operational margin, which results in a charge/discharge amount prediction system practically low in performance.

Meanwhile, there is a method by which characteristic variation and deterioration progress can be handled by performing test charge/discharge for every fixed period, updating characteristic value data, and based on the result, predicting chargeable/dischargeable power. Nevertheless, such test charge/discharge takes time, and accuracy in instantaneous input/output control is low. Moreover, during the test charge/discharge, there arises a difficulty in achievement of simultaneous commensuration, and handling of fluctuation suppression, peak shift and the like, which can cause the imbalance rate, also being practically low in performance.

DETAILED DESCRIPTION

According to embodiments of the present invention, supply of a shortage of power and absorption of an excess thereof are properly performed by highly accurately calculating an inputtable/outputtable power amount of a storage battery.

A storage battery controlling device according to an embodiment of the present invention includes: a battery characteristic estimator configured to calculate an internal resistance of a secondary battery and a function indicating relationship between an open circuit voltage of the secondary battery and a state of charge or an amount of a charge charged of the secondary battery therein, on the basis of data of a temperature, a voltage and a current of the secondary battery which are measured in charging or discharging the secondary battery; and an input/output performance value calculator configured to calculate an inputtable/outputtable power amount of the secondary battery on the basis of the internal resistance and the function calculated by the battery characteristic estimator.

Below, a description is given of embodiments of the present invention with reference to the drawings. The present invention is not limited to the embodiments.

(First Embodiment)

Figure 1:
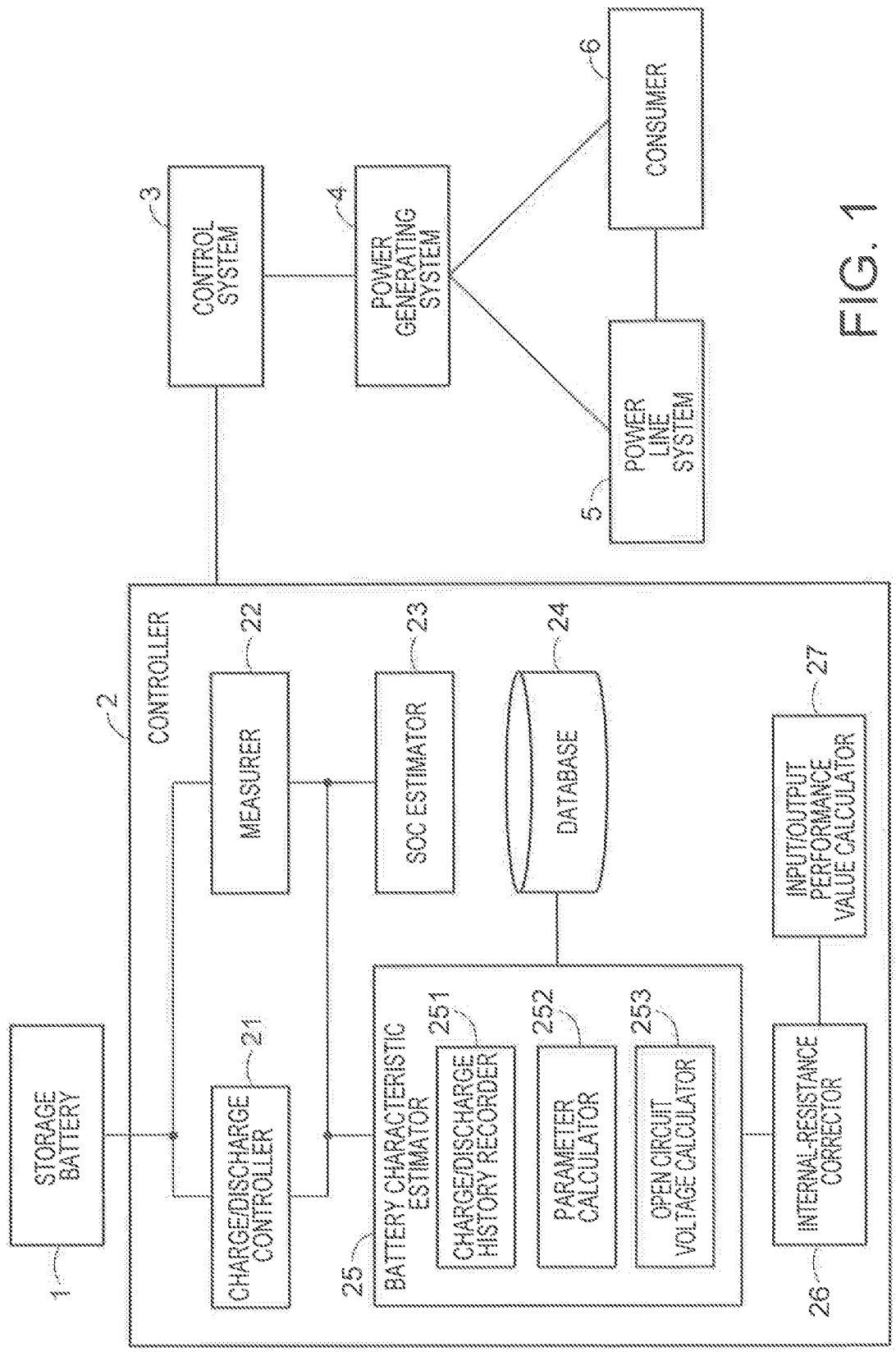
FIG. 1 is a block diagram illustrating an example of a schematic configuration of a power system using a power storage system according to a first embodiment.

FIG. 1 is a block diagram illustrating an example of a schematic configuration of a power system using a power storage system according to a first embodiment. This power system includes a storage battery 1, a controller 2, a control system 3, a power generating system 4, a power line system 5 and a consumer 6. The controller 2 includes a charge/discharge controller 21, a measurer 22, an SOC (State of Charge) estimator 23, a database 24, a battery characteristic estimator 25, an internal resistance corrector 26 and a power amount yielder 27. The battery characteristic estimator 25 includes a charge history recorder 251, an active material amount (parameter) calculator 252 and an open circuit voltage calculator 253.

The storage battery 1 is provided with one or more battery packs. Each of the battery packs includes one or more battery modules. Each of the battery modules includes a plurality of unit cells. The battery packs may have the same number of the battery modules, or may have the different number of battery modules. The battery modules may have the same number of unit cells, or may have the different number of unit cells.

The unit cell may be any secondary battery as long as the secondary battery can be recharged and discharged. The description herein is given assuming that the secondary battery is a lithium ion secondary battery.

In the description below, unless otherwise mentioned, the expression "storage battery 1" includes a battery pack, a battery module, and a unit cell.

The controller 2 is connected to the storage battery 1, controls the storage battery 1, and measures the state thereof. The controller 2 calculates an inputtable/outputtable power amount from the state of the storage battery 1, and thereby, is configured to be able to handle an excess and a shortage of power supply of the power generating system 4.

Figure 2A:
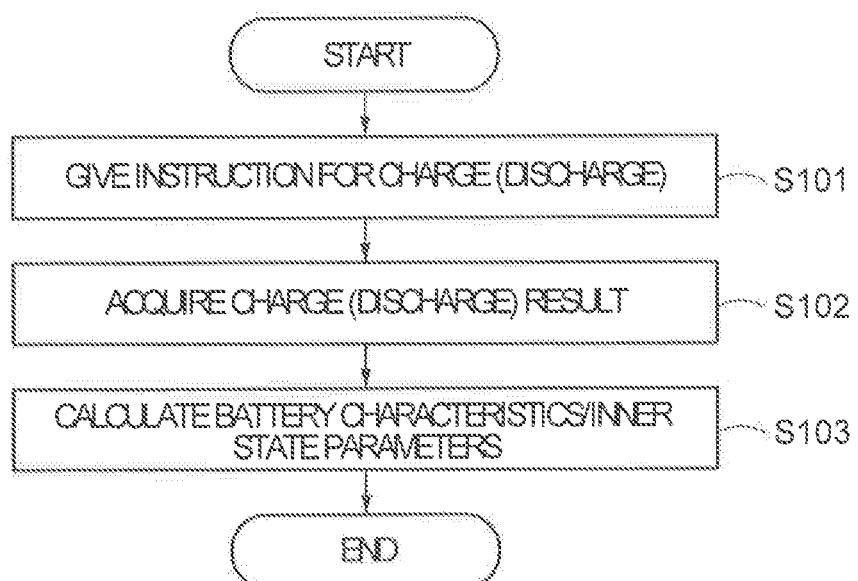
FIGS. 2A and 2B are flowcharts of a schematic process in the controller 2.
Figure 2B:
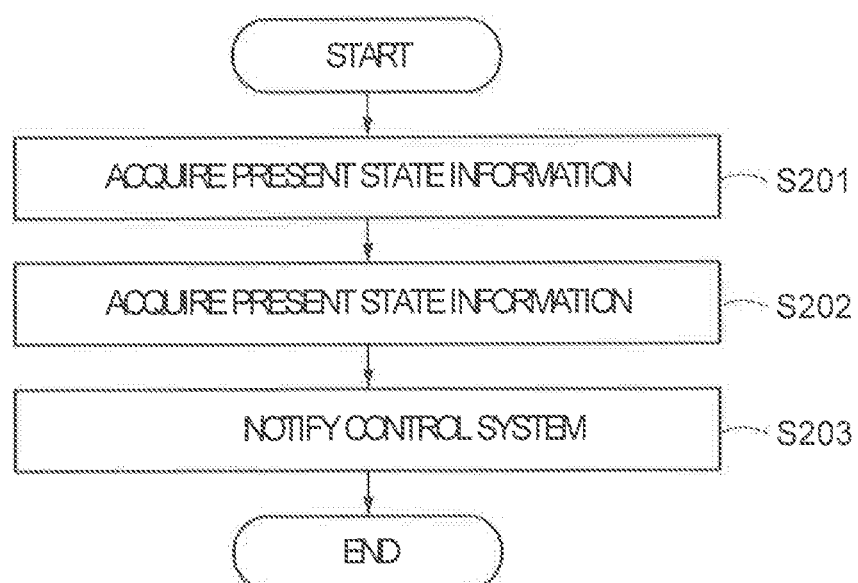

FIGS. 2A and 2B are flowcharts of a schematic process in the controller 2. FIG. 2A illustrates a process for grasping the state of the storage battery 1. The relevant process is performed for grasping the state which changes after the elapse of a fixed period such as deterioration, not the state which is fluctuating in real time, and is supposed to be performed at every elapse of a fixed period. FIG. 2B illustrates a process for calculating the inputtable/outputtable power amount, which process is supposed to be performed at intervals approximately from 10 seconds to 30 minutes since the inputtable/outputtable power amount is needed to be always grasped.

The process for grasping the state of the storage battery 1 is described. The controller 2 gives the storage battery 1 an instruction to be charged (or discharged) under a predetermined condition at every elapse of the fixed period (S101). The controller 2 acquires the charge (discharge) result from the storage battery 1, and analyzes the charge result (S103). Analyzing the charge result is calculating the battery characteristics (cell characteristics) and the inner state parameters of each unit cell on the basis of the charge result. Specifically, the active material amounts, the battery capacities, the internal resistances and the like of the positive electrodes and the negative electrodes of the unit cells are estimated on the basis of data of the currents and the voltages in charging or in discharging. Further, the open circuit voltages (OCV) of the secondary battery are estimated on the basis of the active material amounts of the electrodes.

The inner state parameters assume a positive electrode capacity (the mass of the positive electrode), a negative electrode capacity (the mass of the negative electrode), an SOC deviation, and an internal resistance of the unit cells. The SOC deviation means a difference between the initial charge amount of the positive electrode and the initial charge amount of the negative electrode. The battery characteristics include an OCV curve, a battery capacity, and the like, calculated from the inner state parameters. The internal resistance may also be included in the battery characteristics.

The process for calculating the inputtable/outputtable power amount is described. The controller 2 acquires present state information regarding present states of the unit cells such as the voltages and the temperatures from the storage battery 1 (S201). Subsequently, the inputtable/outputtable power amount (input/output performance value) is calculated on the basis of the beforehand estimated battery characteristics (cell characteristics) and the inner state parameters of each cell, and the present state information (S202). The controller 2 successively reports the calculated inputtable/outputtable power amount to the control system 3 (S203). Thereby, the control system 3 can grasp the state of the storage battery 1, and the controller 2 receives an instruction from the control system 3 to instruct the storage battery 1 to perform charge/discharge (input/output).

Details of the individual units included in the controller 2 and operation of these are mentioned later.

The control system 3 is an external host controller which controls the controller 2. The control system 3 instructs the storage battery 1 via the controller 2 to perform charge/discharge for the purpose of achievement of simultaneous commensuration with the power line system 5, stabilization of the voltage and the frequency of the power line system 5, suppression of fluctuation of the power generation amount and the load amount, peak shift and the like.

The control system 3 predicts the power generation amount of the power generating system 4 connected to the power line system 5 and the load amounts of various load devices in the power consumer. On the basis of this prediction, when the demand amount of the power consumer exceeds the supply amount (power generation amount), a needed amount is correctly taken out of the storage battery 1 to prevent occurrence of the imbalance rate. Moreover, when the supply amount (power generation amount) exceeds the demand amount of the power consumer, the power is charged in the storage battery 1 without waste to suppress deterioration of the cells due to overcharge in the storage battery 1.

The control system 3 determines a battery package, a battery module and a cell to be charged/discharged and input/output on the basis of the purpose or the plan of achievement of the simultaneous commensuration, suppression of the fluctuation, the peak shift and the like. Then, the control system 3 instructs the controller 2 so as to charge/discharge the determined battery package, battery module and cell to the controller 2. Notably, the relevant instruction may be directly reported to the storage battery 1, not to the controller 2.

The power line system 5 is connected to the power system 5, the consumer 6 and the like and inputs and outputs the power.

The power generating system 4 is configured to be a power generating system which utilizes natural energy such as a solar power generation system and a wind power generating system, and is supposed to be unstable in supply of the power. It should be noted that the power generating system 4 is not limited to these.

The consumer 6 includes a private house, a building, a factory and the like, and is configured not only to receive power supply from the power line system 5 but also to be able to supply power generated by the consumer 6 to the power line system 5.

Notably, the system configuration described here is exemplary, not limited to this configuration. For example, the control system 3 may be connected to both the power line system 5 and the power generating system 4. Conversely, it may be connected, not to the power line system 5 or the power generating system 4, to a virtual power plant or the like. Otherwise, the power line system 5 or the power generating system 4 may be absent.

Next, the individual units included in the controller 2 are described.

The charge/discharge controller 21 instructs the storage battery 1 to perform charge/discharge under a predetermined condition at every elapse of a fixed period. Since the charge/discharge is needed to be performed before characteristic change due to deterioration progress of the cells of the storage battery 1 cannot be negligible, the relevant fixed period is properly predetermined in consideration of the characteristic change. Moreover, it may instruct this upon reception of an instruction from the controller 3.

The measurer 22 measures information about the storage battery 1 in real time. Examples of the information to be measured include the voltage between positive electrode terminals and negative electrode terminals of unit cells, current flowing through unit cells, and the temperatures of unit cells.

The SOC estimator 23 estimates the present SOC (state of charge) of the storage battery 1 from the real time measurement data of the voltages, the currents and the temperatures measured by the measurer.

The database 24 stores a function indicating relationship between the charge amount and the potential of the positive electrode or the negative electrode constituting each set of electrodes included in the unit cell and the like.

The battery characteristic estimator 25 calculates the present battery characteristics. The battery characteristics are an internal resistance, an OCV curve and a battery capacity, and are calculated and updated for every fixed period. The OCV curve stated here means a graph indicating relationship between a certain index regarding the battery and the OCV. For example, the OCV curve may be an SOC-OCV graph which illustrates the relationship between the SOC and the OCV, or may be a charge amount-OCV graph which illustrates the relationship between the charge amount and the OCV. The type of an OCV curve to be calculated may be defined in advance.

To evaluate the battery characteristics, the known battery characteristics measurement method can be used. More specifically, the examples of the method include a charge or discharge experiment in which a battery capacity is actually measured by supplying current, a current pausing method in which an internal resistance value is mainly measured, and an electrochemical measurement such as an AC impedance measurement. Measurement can be performed by combination thereof. Alternatively, a method in which battery characteristics are simply estimated by analyzing a charge or discharge curve may be used.

The charge history recorder 251 records data (a history) of voltages, currents, and temperatures, or the like measured by the measurer 22 during charge or discharge of the storage battery 1. The recording is repeatedly performed at predetermined time intervals from start of charge of the storage battery 1 to completion of the charge of the storage battery 1. The time intervals may be freely set according to a process in which the record is to be used. For example, the time intervals may be set to approximately 0.1 to 1 second intervals. A time at which the recording is performed may be an absolute time, or may be a relative time which is counted from start of charge. When the process performed by the charge history recorder 106 is repeated at the predetermined time intervals, recording of a time may be omitted.

Figure 3:
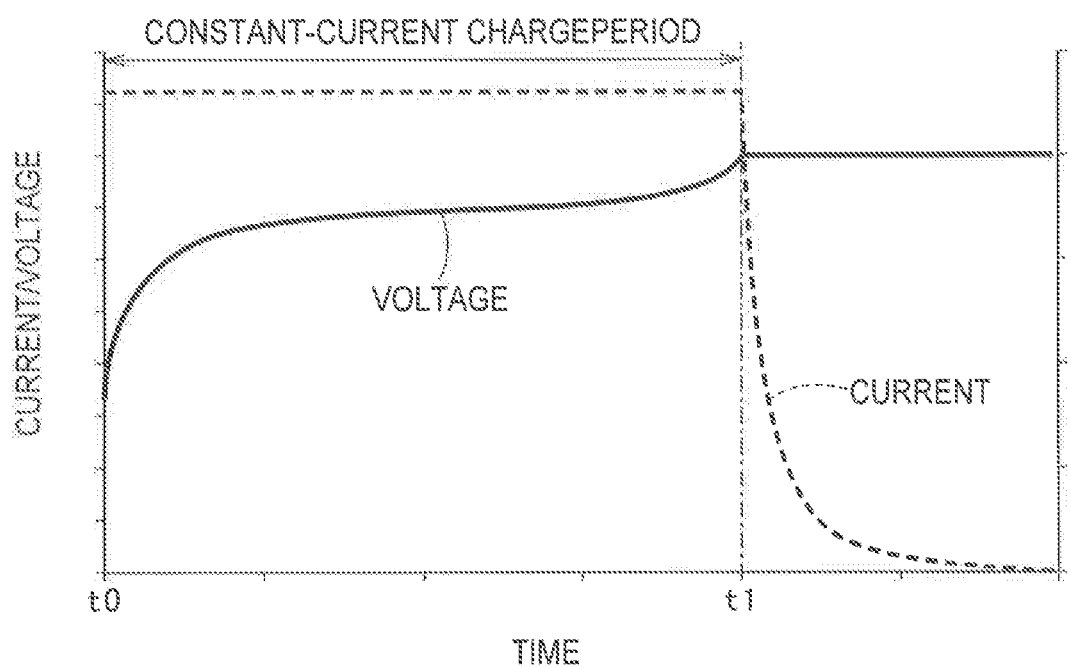
FIG. 3 illustrates an example of a history of a current/voltage during charge.

FIG. 3 illustrates an example of data of a current and a voltage during charge. The data illustrated in FIG. 3 is an example in constant-current constant-voltage charge, which is generally used as a charge method for secondary batteries. In FIG. 3, the broken line represents a current history and the solid line represents a voltage history.

In a process performed by the active material amount calculator 252, which is described later, the charge history of the whole constant-current constant-voltage charge may be used, or only the charge history of a constant-current charge period (t0 to t1 in FIG. 3) may be used, for example.

The active material amount calculator 252 calculates an amount of an active material forming the positive electrode or the negative electrode of a unit cell, an initial charge amount, the internal resistance of a unit cell on the basis of the history recorded by the charge history recorder 251. Specifically, a function for calculating a battery voltage from the active material amount and the internal resistance is used. An active material amount and an internal resistance which reduce a difference in battery voltage calculated on the basis of the function, and the current data and the voltage data during charge or discharge of the battery are obtained through regression calculation. Notably, while Patent Literature 6 discloses an example of a case where a positive electrode includes a plurality of active materials, in the present embodiment, an example of a secondary battery having a positive electrode and a negative electrode each including one active material is described.

When the secondary battery having a positive electrode and a negative electrode each made from one active material is charged, a terminal voltage "$V_t$" at time "t" is expressed by the following expression.

[Expression 1]

$$V_t = f_c\left(q_0^c + \frac{q_t}{M_c}\right) - f_a\left(q_0^a + \frac{q_t}{M_a}\right) + RI_t \qquad (1)$$

"$I_t$" represents a current value at time "t", and "$q_t$" represents a charge amount of the battery at time "t". "$f_c$" represents a function showing the relationship between the charge amount and the potential of the positive electrode, and "$f_a$" represents a function showing the relationship between the charge amount and the potential of the negative electrode. "$q_o^c$" represents the initial charge amount of the positive electrode, and "$M_c$" represents the mass of the positive electrode. "$q_o^a$" represents the initial charge amount of the negative electrode, and "$M_a$" represents the mass of the negative electrode. "R" represents the internal resistance.

As the current value "$I_t$", the current data recorded by the charge history recorder 251 is used, and the charge amount $q_t$ can be calculated by time-integrating the current value "$I_t$". The functions "$f_c$" and "$f_a$" are assumed to be stored as function information in the database 24.

Five values (a parameter set), the initial charge amount "$q_o^c$" of the positive electrode, the mass "$M_c$" of the positive electrode, the initial charge amount "$q_o^a$" of the negative electrode, the mass "$M_a$" of the negative electrode, and the internal resistance "R" are estimated through regression calculation.

Figure 4:
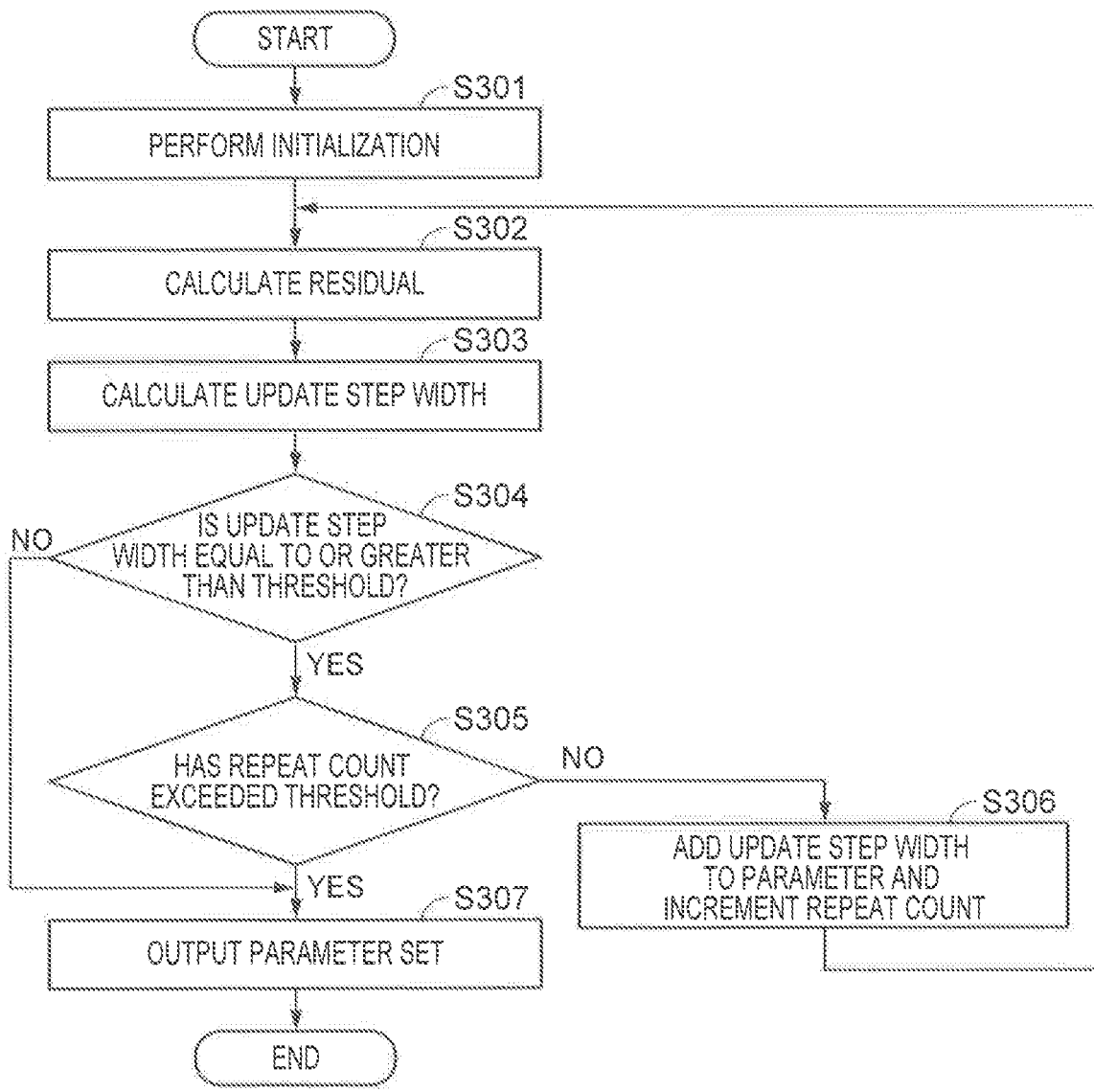
FIG. 4 is a flowchart illustrating a flow of a process of an active material amount calculator.

FIG. 4 is the flowchart illustrating the flow of the process to be performed by the active material amount calculator 252. The process to be performed by the active material amount calculator 252 starts after completion of charge of the storage battery 1.

The active material amount calculator 252 performs initialization to set initial values for the aforementioned parameter set and to set the repeat count of regression calculation to zero (S301). The initial value, for example, uses a value calculated such as when the most recent process of calculating the active material amount.

The active material amount calculator 252 calculates a residual E which is expressed by the following expression (S302).

[Expression 2]

$$E = \sum_{t=0}^{t_{end}} (V_{bat\_t} - V_t)^2 = \sum_{t=0}^{t_{end}} \left( V_{bat\_t} - \left( f_c\left(q_0^c + \frac{q_t}{M_c}\right) - f_a\left(q_0^a + \frac{q_t}{M_a}\right) + RI_t \right) \right)^2 \quad (2)$$

wherein "$V_{bat\_t}$" represents the terminal voltage at time "t", and "$t_{end}$" represents a charge end time.

The active material amount calculator 252 calculates an update step width of the parameter set (S303). The update step width of the parameter set can be calculated by method, such as a Gauss-Newton method, a Levenberg-Marquardt method.

The active material amount calculator 252 determines whether the update step width is less than a predetermined width (S304). When the update step width is less than the predetermined width (No at S304), the active material amount calculator 252 determines that the calculation has converged, and outputs the present parameter set (S307). When the update step width is equal to or greater than a predetermined threshold (Yes at S304), whether the repeat count of regression calculation is greater than a predetermined value is checked (S305).

When the repeat count of regression calculation is greater than the predetermined value (Yes at S305), the present parameter set is outputted (S307). When the repeat count of regression calculation is equal to or less than the predetermined value (No at S305), the update step width calculated at S303 is added to the parameter set and the repeat count of regression calculation is incremented by one (S306). Subsequently, the process returns to calculation of the residual (S302). The flowchart illustrating the flow of the process to be performed by the active material amount calculator 252 has been described above.

In the present embodiment, a charge history is used as an input to the active material amount calculator. However, a discharge history may be used to similarly calculate an active material amount. Also in the case where a discharge history is used, the process flow to be performed by the active material amount calculator 252 and parameters to be used may be same as those in the case where a charge history is used to calculate the active material amount.

The open circuit voltage calculator 253 calculates the relationship between the charge amount of the battery and the open circuit voltage by using the initial charge amount "$q_o^{c}$" of the positive electrode, the mass "$M_c$" of the positive electrode, the initial charge amount "$q_0^{a}$" of the negative electrode, and the mass "$M_a$" of the negative electrode calculated by the active material amount calculator 252.

Figure 5:
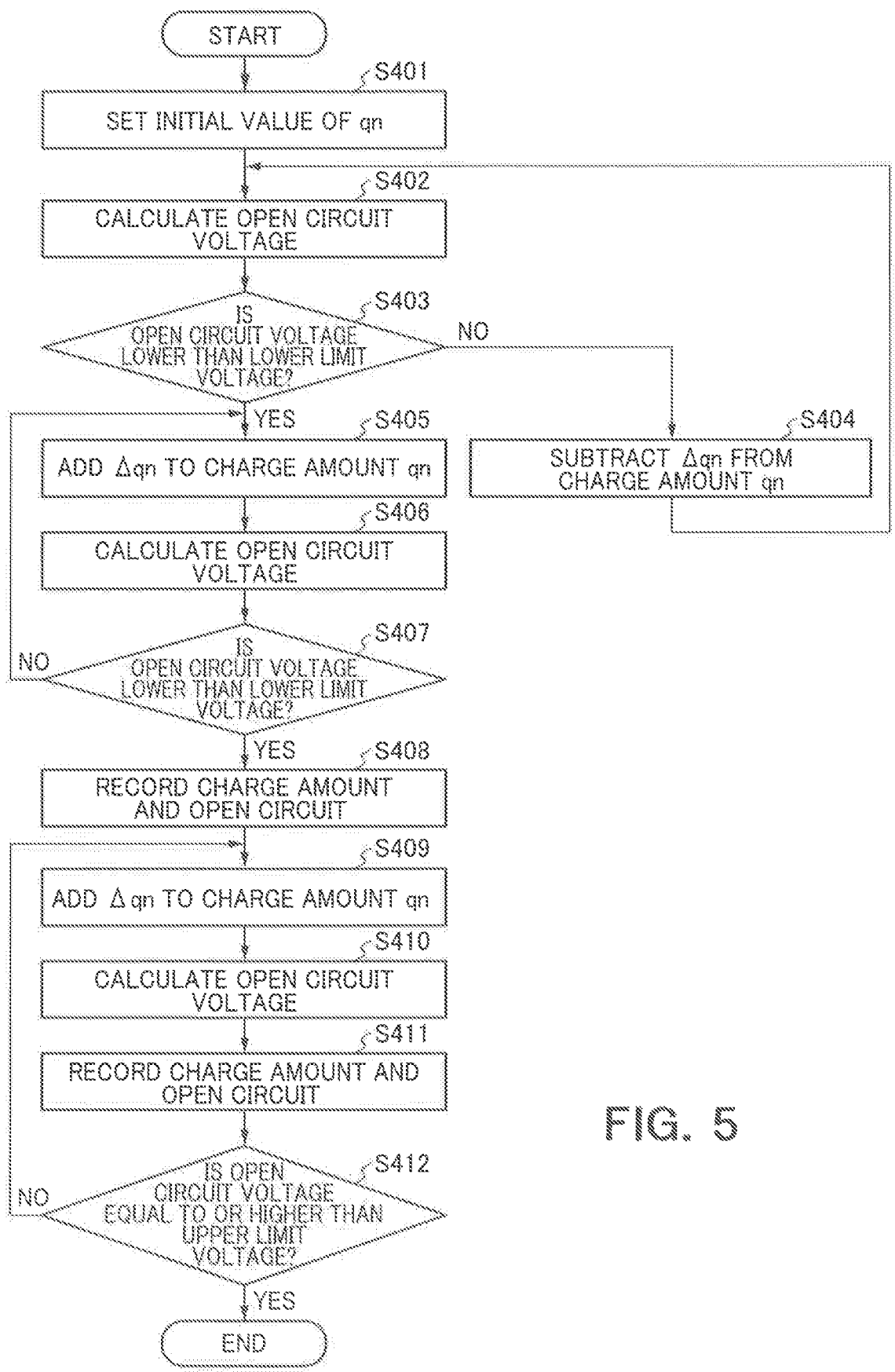
FIG. 5 illustrates a flowchart of a process flow to be performed by an open circuit voltage calculator.

FIG. 5 is a flowchart of a process flow to be performed by the open circuit voltage calculator 253. The flowchart starts after the process performed by the active material amount calculator 252 is ended. In this flowchart, the charge amount $q_n$ is increased and decreased by a predetermined value $\Delta q_n$, the charge amount $q_n 0$ is found at which the open circuit voltage exceeds the lower limit, and $q_n$ is increased by $\Delta q_n$ from $q_{n0}$ as an initial value until the open circuit voltage exceeds the upper limit, and the charge amount and the open circuit voltage are recorded every time the increase is performed. Accordingly, the relationship between the charge amount and the open circuit voltage in a range from the lower limit to the upper limit of the open circuit voltage can be calculated. The difference between the charge amount $q_n 0$ and the charge amount $q_n$ at which the open circuit voltage is the upper limit is a battery capacity.

The open circuit voltage calculator 253 sets an initial value of the charge amount "$q_n$" (S401). The initial value of "$q_n$" may be set to zero or a value which is less than zero by a few percent of the nominal capacity of the storage battery 1. Specifically, if the nominal capacity of the storage battery 1 is 1000 mAh, it may be set within a range approximately from −50 mAh to 0 mAh.

The open circuit voltage calculator 253 calculates the open circuit voltage (S402). To calculate the open circuit voltage, the following expression can be used.

[Expression 3]

$$E_n = f_c\left(q_0^c + \frac{q_n}{M_c}\right) - f_a\left(q_0^a + \frac{q_n}{M_a}\right) \quad (3)$$

Next, the open circuit voltage calculator 253 compares the calculated open circuit voltage with a predetermined lower limit voltage of a battery (S403). The lower limit voltage of a battery is defined on the basis of combination of the positive electrode active material and the negative electrode active material used in the storage battery 1. Specifically, in terms of each of the safety, the lifetime, the resistance, or the like, the appropriate usage ranges of the voltage for the positive electrode active material and the negative electrode active material are defined, and the combination of the ranges is used to determine the lower limit and the upper limit of the usage range for the battery.

When the open circuit voltage is not less than the predetermined lower limit voltage (No at S403), $\Delta q_n$ is subtracted from the charge amount $q_n$ (S404) and the open circuit voltage is calculated again (S402). When the open circuit voltage is less than the predetermined lower limit voltage (Yes at S403), the open circuit voltage calculator 253 adds $\Delta q_n$ to the charge amount $q_n$ (S405). In this way, the charge amount $q_n$ approximates to the lower limit value. A value of $\Delta q_n$ can be freely determined. For example, $\Delta q_n$ may be set to approximately 1/1000 to 1/100 of the nominal capacity of the storage battery 1. Specifically, if the nominal capacity of the storage battery 1 is 1000 mAh, $\Delta q_n$ may be set to a range of approximately 1 mAh to 10 mAh.

The open circuit voltage calculator 253 calculates the open circuit voltage by using the added charge amount $q_n + \Delta q_n$ (S406). Subsequently, the open circuit voltage calculator 253 compares the calculated open circuit voltage with the aforementioned lower limit voltage (S407). When the open circuit voltage is lower than the lower limit voltage (No at S407), the process returns to S405 and $\Delta q_n$ is added to the charge amount $q_n$ again (S405). When the open circuit voltage is equal to or higher than the lower limit voltage (Yes at S407), the charge amount $q_n$ at that time is set to $q_n0$ because the open circuit voltage has exceeded the lower limit value, and the charge amount $q_n0$ and the open circuit voltage En are recorded together (S408). The value of the charge amount $q_n0$ may be set as a reference value and expressed by "0". In this case, the value obtained by subtracting the value of $q_n0$ from the value of the charge amount $q_n$, in subsequent recording.

The open circuit voltage calculator 253 adds $\Delta q_n$ to the charge amount $q_n$ (S409), calculates the open circuit voltage (S410), and records the calculated open circuit voltage En and the value obtained by subtracting $q_n0$ from the charge amount $q_n$(S411).

The open circuit voltage calculator 253 compares the calculated open circuit voltage with the predetermined upper limit voltage of the battery (S412). The upper limit voltage of the battery is defined on the basis of combination of the positive electrode active material and the negative electrode active material used in the storage battery 1. When the open circuit voltage is lower than the predetermined upper limit voltage (No at S412), the process returns to adding of $\Delta q_n$ to the charge amount again (S409). When the open circuit voltage is equal to or higher than the predetermined upper limit voltage (Yes at S412), the process is ended. The flowchart illustrating the process flow to be performed by the open circuit voltage calculator 253 has been described.

Figure 6A:
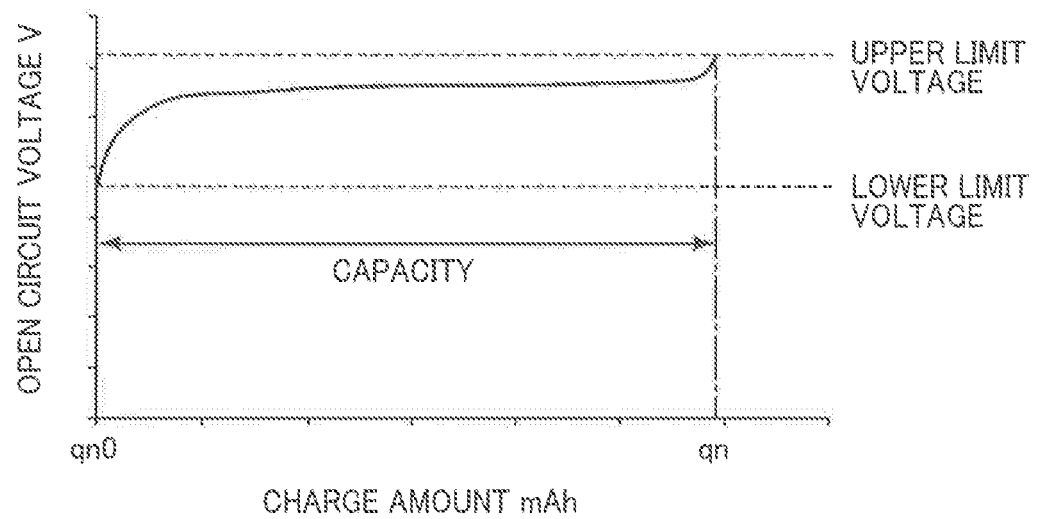
FIGS. 6A and 6B illustrate an example of graphs (charge amount-OCV curves) illustrating the relationships between a charge amount and an open circuit voltage.
Figure 6B:
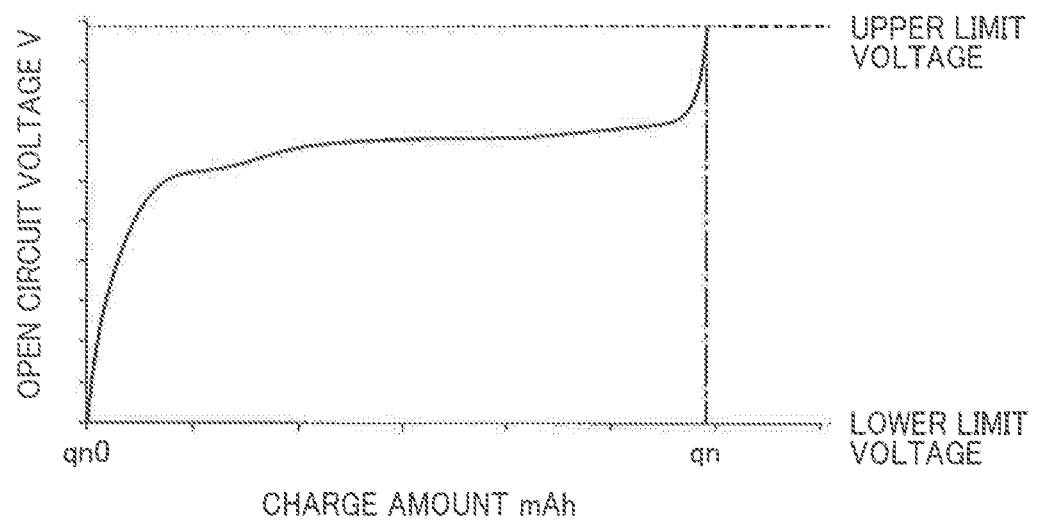
Figure 7:
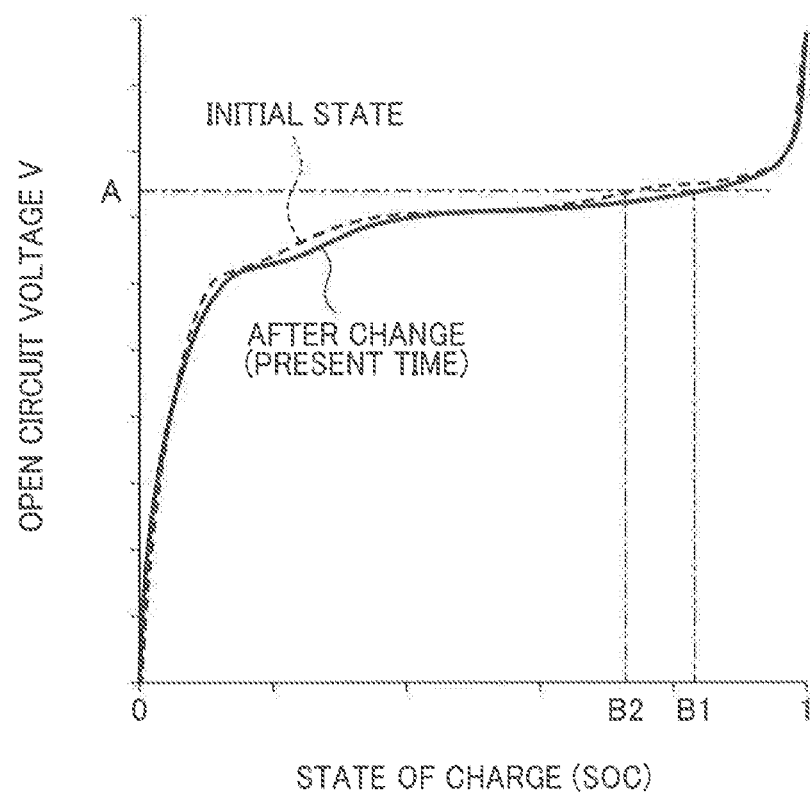
FIG. 7 illustrates an example of a graph (an SOC-OCV curve) illustrating the relationship between an SOC and an open circuit voltage.

FIGS. 6A and 6B illustrate an example of graphs (charge amount-OCV curves) illustrating the relationships between a charge amount and an open circuit voltage. FIG. 6A illustrates a charge amount-OCV curve at the present state obtained by the open circuit voltage calculator 253. FIG. 6B is a diagram obtained by taking out a range from the lower limit voltage to the upper limit voltage of the ordinate, from the graph illustrated in FIG. 6A. FIG. 7 illustrates an example of a graph (an SOC-OCV curve) illustrating the relationship between an SOC (State of Charge) and an open circuit voltage. FIG. 7 differs from FIGS. 6A and 6B in that the abscissa in FIG. 7 indicates not the charge amount but the SOC. In FIG. 7, a graph (a solid line) obtained by converting the graph illustrated in FIG. 6B into a SOC-OCV curve and the SOC-OCV curve (a broken line) of the battery at the initial state are overlapped. In FIG. 7, the broken line represents the open circuit voltage of the battery at the initial state, and the solid line represents the open circuit voltage of the battery after change (present time) due to deterioration of the battery or the like. The SOC indicates the ratio of the present charge amount with respect to the full charge capacity, and is expressed by a value from 0 to 1.

In the description herein, the simple term "charge state" includes not only the SOC but also the charge amount and the like.

The length of the curve after change becomes shorter as the capacity decreases. However, FIG. 7 illustrates that not only the length but also the shape of the curve changes. For example, in the case where the state of charge (SOC) is estimated on the basis of the open circuit voltage, when the measured open circuit voltage is A, the normal charge state (the present state of charge) is B1. However, if the curve of the open circuit voltage is considered not to change, that is, if the open circuit voltage is to be obtained from the SOC-OCV curve at the initial state, B2 is obtained as the charge state at the voltage A, and thus, efficiency in estimation of the charge state is deteriorated. Therefore, as a result of using the SOC-OCV curve at the present state, as in the first embodiment, the charge state can be measured with high accuracy.

Therefore, according to the first embodiment, it is possible to accurately grasp the relationship (the charge amount-OCV curve or the SOC-OCV curve) which changes with use between the charge amount and the open circuit voltage, without performing special charge and discharge, and thus, the charge state can be highly accurately estimated.

The case where the positive electrode and the negative electrode of the secondary battery are each formed from one kind of an active material has been described herein. However, the present invention can be similarly applied to a secondary battery in which any of the positive electrode and the negative electrode thereof is formed from a plurality of kinds of active materials. Further, in the case where a database for storing the active material amounts of the storage battery 1 is prepared in advance, the open circuit voltage calculator 253 can calculate a graph showing the relationship between the charge amount and the open circuit voltage of the secondary battery within a predetermined voltage range of the battery, by using the active material amounts stored in the database.

The internal resistance corrector 26 corrects, on the basis of a temperature T measured by the measurer 22, the internal resistance R calculated by the battery characteristic estimator 25 to the internal resistance of the storage battery 1 at the present temperature T. The corrected internal resistance is defined as Rcr.

Temperature correction of the internal resistance is performed by the internal resistance corrector 26, will be described. The temperature correction of the internal resistance provides, for example, means to correct the influence of temperature from a result of a battery characteristics diagnosis method, and to expand a temperature range where the battery characteristics diagnosis method can be preferably applied, a battery characteristics diagnosis method in which the battery capacity, the internal resistance, and the degree of degradation of each of the active materials of each of the positive and negative electrodes are estimated from the charge and discharge curve by reference to the charge amount—OCV data of each of the active materials.

The principle and method of the temperature correction are described. Lithium-ion secondary batteries each include a positive electrode and a negative electrode opposite to each other, and an electrolyte containing a Li salt between the positive and negative electrodes. Active materials are applied onto current collecting foils of the positive and negative electrodes. The current collecting foils are connected to the positive electrode and negative electrode terminals on the battery exterior. During charge and discharge of the battery, Li ions move between the positive electrode active material and the negative electrode active material via the electrolyte so that electrons flow from the active materials to external terminals.

Each of the active materials has a unique potential and a unique amount of Li which can be reversibly inserted or desorbed. An energy quantity which the battery can store in a range of a fixed charge and discharge voltage is determined by the amounts of the positive electrode active material and the negative electrode active material in the battery and combination thereof.

Further, at the time of charge and discharge, there are caused Li ion conduction, charge transfer resistance due to Li ions in the electrolyte penetrating into the active material, resistance of a film formed on the interface between the electrolyte and the active material, and electrical resistance due to electrons flowing through the active material and the current collection foil. The internal resistance of the battery is the sum total of the Li ion transfer resistance, the electron transfer resistance, the charge transfer resistance, the film resistance, and the diffused resistor in the positive electrode and the negative electrode.

Generally, in a battery control system in a lithium ion secondary battery, the voltage of each of the unit cells, the temperature in the battery pack, and the like, are measured in the viewpoint of safety. If the battery performance can be calculated on the basis of such measurement data, deterioration diagnosis can be performed without requiring much costs and time.

However, it is very difficult to analyze the behavior of the battery during actual use in which a charge and discharge condition finely and randomly varies. The reason for this is that since such a behavior is a phenomenon in which a resistance depending on time, a diffusion resistance, a relaxation process, and the like are complexed in a complicated way, a calculation model therefor is difficult to obtain. In contrast, for example, if only a simply behavior such as charge of an electric vehicle under a predetermined condition is analyzed, the analysis can be performed using a simplified model.

Therefore, in the battery performance estimating method according to the present embodiment, values of variables are determined by fitting calculation using, as variables, the amount of each of the active materials, the rise (overvoltage) of the battery voltage due to internal resistance at application of charge current, on the basis of an "electric potential— charge amount" curve associated with the Li insertion-elimination reaction of each active material, which is obtained by data (charge-discharge curve) of charge or discharge under fixed conditions. Thereby, it is possible to estimate the capacity reduction (reduction of each active material) and the increase in internal resistance.

Figure 8:
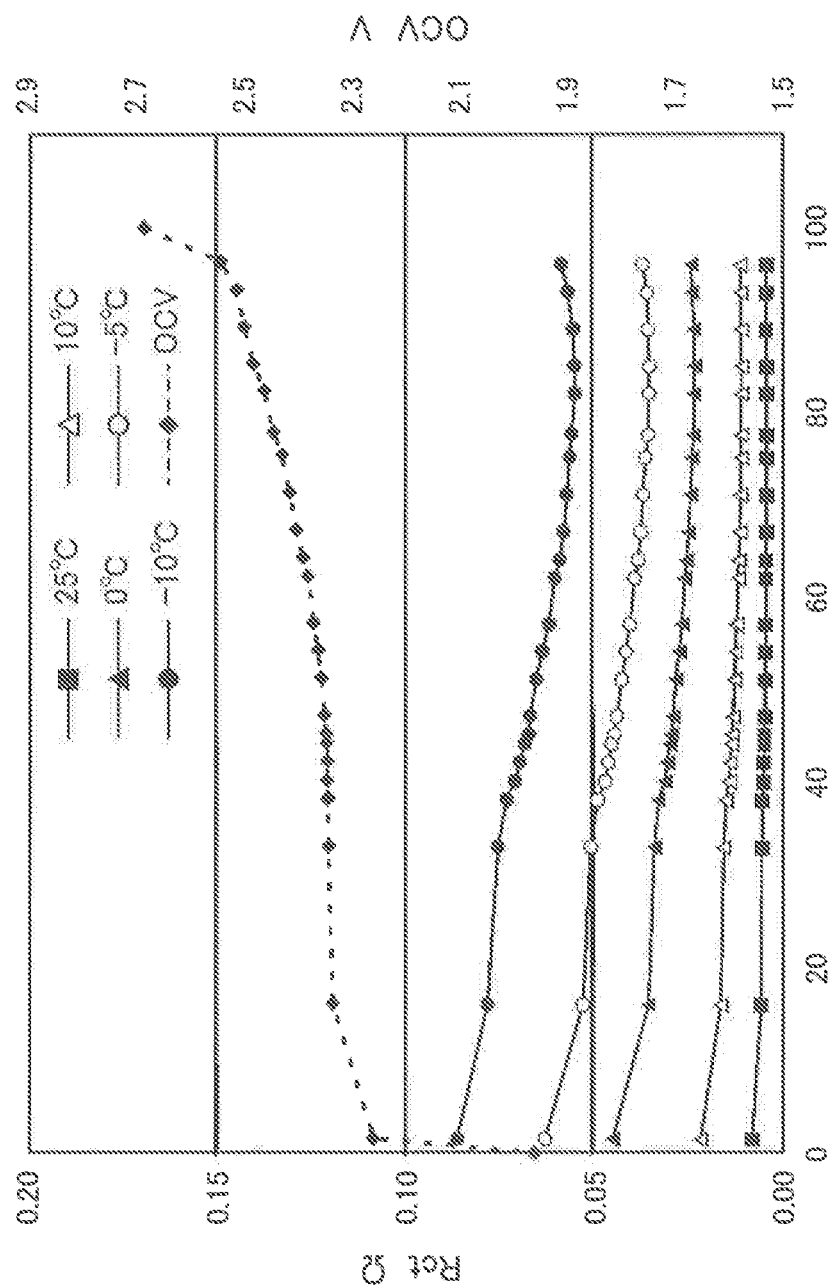
FIG. 8 illustrates the relationships, at respective temperatures, between SOCs and reaction resistances Rct.

However, under an actual use situation of a battery, a temperature condition varies according to an external environment, the state of the battery during charge and the like. When the temperature of the battery changes, the performance of the battery changes. In particular, the internal resistance increases greatly depending on reduction in temperature. FIG. 8 illustrates the relationships, at respective temperatures, between SOCs and reaction resistances Rct. A reaction resistance Rct is one of internal resistance components. As illustrated in FIG. 8, reaction resistances differ greatly according to difference in temperature. Accordingly, even if the analysis results of measurement data of different temperatures are compared with one another, it is difficult to evaluate the increase in internal resistance due to deterioration because the results are greatly influenced by variation in analysis result caused by temperatures.

Accordingly, in order to estimate the battery characteristics and evaluate progress of deterioration on the basis of measurement data of the battery being actually used, temperature correction on the internal resistance is needed.

Internal resistances of the battery include of a plurality of types of resistance components. The resistance components differ from one another in temperature dependency and increase speed due to deterioration. For this reason, with progress of deterioration, the ratio of the resistance changes, and accordingly, the temperature dependency of the internal resistance as a whole also changes. In view of this point, in temperature correction of internal resistances in the battery performance estimating method according to the present embodiment, internal resistances are divided into three components, which are a reaction resistance "Rct", a diffusion resistance "Rd", and an ohmic resistance "Rohm". The components are corrected to a reference temperature "T0", in accordance with the respective unique temperature dependencies, and then, are summed up.

Specifically, the battery temperature at the time of measurement is corrected to the reference temperature by mathematical expressions below. In the expressions below, "Rgas" represents a gas constant, "T0" represents the reference temperature, T represents the battery temperature at the time of measurement, "R1" represents a constant, and "Ea", "Eb", and "Ec" each represent a constant for determining the temperature dependency of the corresponding resistance component.

(Reaction Resistance)

$$Rct(T0)=Rct(T)\times\text{Exp}(-Ea/(Rgas\cdot T))/\text{Exp}(-Ea/(Rgas\cdot T0))$$

(Diffusion Resistance)

$$Rd(T0)=Rd(T)\times\text{Exp}(-Eb/(Rgas\cdot T))/\text{Exp}(-Eb/(Rgas\cdot T0))$$

(Ohmic Resistance)

$$\text{Rohm}(T0)=(\text{Rohm}(T)-R1)\times\text{Exp}(-Ec/(Rgas\cdot T))/\text{Exp}(-Ec/(Rgas\cdot T0))+R1$$

Figure 9:
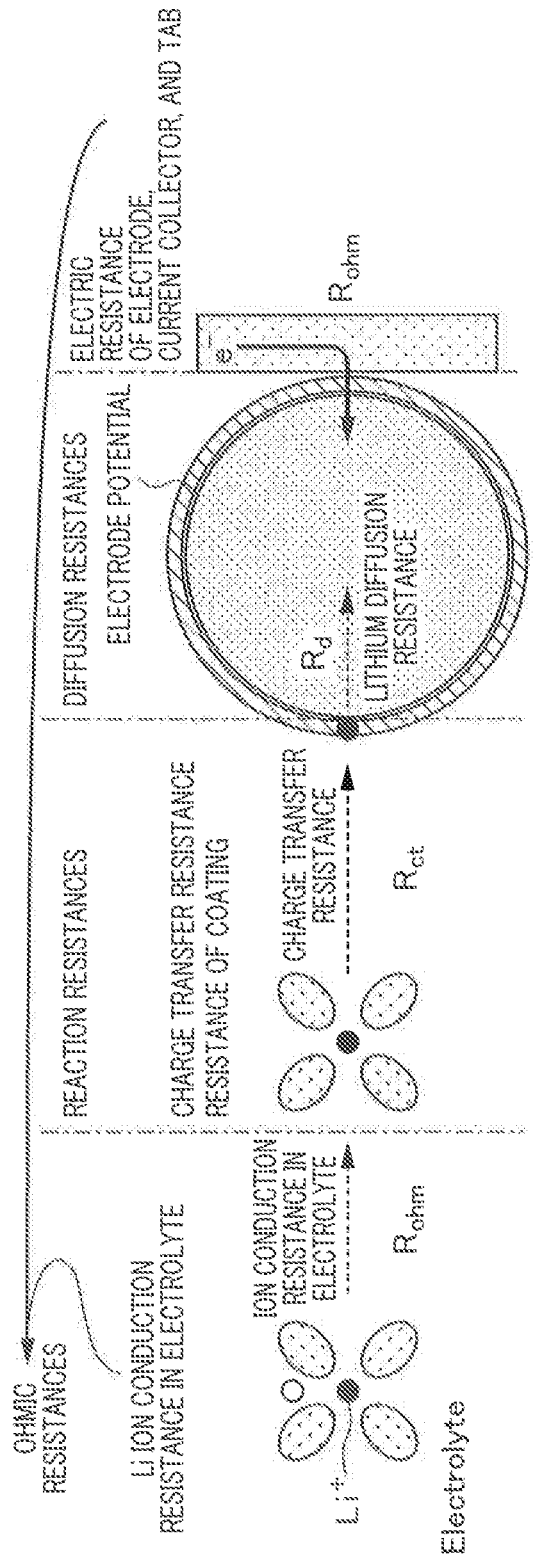
FIG. 9 is a diagram regarding resistive components.

FIG. 9 is a diagram regarding the resistance components. The ohmic resistances include an ion conduction resistance in an electrolyte and an electron conduction resistance in the battery. The electron conduction resistance which has a low temperature dependency is a constant. The reaction resistances include a charge transfer resistance and the resistance of a surface coating. The diffusion resistances include resistances associated with diffusion of lithium ions inside the active materials and the electrodes.

"Ec" of the ohmic resistance represents an active energy associated with transfer of Li ions in the electrolyte. "Ea" of the reaction resistance represents an energy generated when Li ions solvated in the electrolyte are removed on an active material surface. "Eb" of the diffusion resistance is considered as an active energy associated with transfer of Li ions between sites in an active material. Accordingly, the above values can be considered as constant values which are not changed in the deterioration process.

The values "Ea", "Eb", and "Ec" can be calculated by measuring the AC impedances, or the current pulses of unit cells, for example. The values "Ea", "Eb", and "Ec" about the battery to be analyzed are calculated from measurement values, and stored in the database, in advance. The values may be referred in temperature correction calculation of the internal resistances.

A method of estimating the battery characteristics from the charge and discharge curve by dividing the internal resistances into three types of components is described.

In the deterioration process of the battery, all of the three components of the internal resistances increase, but the increase speeds due to the deterioration differ from one another. Accordingly, the assumption that deterioration does not occur may be established as a result of limiting the lifetime range of the battery to be evaluated. For example, in a battery for electric vehicles for which the evaluation lower limit is assumed to be the residual capacity of approximately 90 to 70%, some of the resistance components can be approximated to a fixed value throughout the battery lifetime, although the use condition, the configuration of the battery, and the like can have some influences.

(First Method)

In a first method for calculating the three components from the calculated internal resistance values of the battery, the ohmic resistance component and the diffusion resistance component are considered to be fixed, and the residual is considered as the reaction resistance. This method assumes that deterioration does not cause increase in the ohmic resistance component and the diffusion resistance component, and considers only temperature change which depends on a cell temperature. In analysis of a charge and discharge curve, the ohmic resistance component and the diffusion resistance component at the temperature T are subtracted from the internal resistance value estimated for the temperature T, and the remainder is regarded as the reaction resistance component. The components are subjected to temperature correction to the reference temperature T0, and summed up, so that the internal resistance values at the reference temperature T0 are calculated. The first method is suitable for moderate usage, in which, for example, the SOC falls within a range in which the active materials of the positive and negative electrodes are stable, the temperature is equal to or lower than the approximate room temperature, and the current of the battery is relatively small.

(Second Method)

In a second method, the ohmic resistance component and the diffusion resistance component are estimated by a function regarding the relationship between the two resistance components and an accumulated time or accumulated power amount, and the residual is regarded as the reaction resistance. This method calculates the ohmic resistance component and the diffusion resistance component, while assuming that deterioration in the ohmic resistance component and the diffusion resistance component correlates with a time or a cycle amount of charge and discharge. In analysis of a charge and discharge curve, the calculated ohmic resistance component and the calculated diffusion resistance component are subtracted from the internal resistance value estimated for the certain temperature T, and the remainder is regarded as the reaction resistance component. The components are subjected to temperature correction to the reference temperature T0, and summed up, so that the internal resistance values at the reference temperature T0 are calculated. The second method is suitable for a case where deterioration in the ohmic resistance component and the diffusion resistance component is relatively small, but actually progresses.

Which of an accumulated time and an accumulated power amount is used may be determined according to the use environment or the like. For example, for a case where deterioration of the battery progresses due to generation of gas during preservation, deterioration amount estimation using an accumulated time is suitable. In contrast, for a case where deterioration of the battery, such as change in volume of the active materials, is remarkable due to repetition of a process cycle such as charge and discharge, deterioration amount estimation using an accumulated power amount is suitable.

Data on an accumulated time or an accumulated power amount is assumed to be held in advance. The accumulated power amount may be replaced with an operation amount of a device, such as the travel distance of a vehicle, for example.

(Third Method)

In a third method, a reaction resistance component and a diffusion resistance component are estimated from data on the diffusion resistances and the charge amounts of the respective materials which are held in advance or data on the reaction resistances and the charge amounts of the respective materials which are held in advance, and the residual is regarded as an ohmic resistance component. In the third method, unlike the first and second methods, the values of the reaction resistance and the diffusion resistance are estimated by performing regression calculation, in analysis of the charge and discharge curve, with reference to the reaction resistance-charge amount curve of an active material, the diffusion resistance-charge amount curve of an active material, or the internal resistance-charge amount curve of the battery. By using the fact that the resistance component of an active material has a dependency on the charge amount, that is, the SOC, and that the tendency of the dependency does not change even after deterioration, the compositions of the internal resistance are estimated from the tendency of internal resistance-charge amount of the battery.

A reaction resistance-charge amount curve and a diffusion resistance-charge amount curve of an active material need to be measured in advance. The form of change due to deterioration, which depends on the configuration of the battery, needs to be measured in advance. For example, it is considered that, when a resistive surface film is formed, it is uniformly increased by a constant value according to the formation of the film, and that, when the active material is decreased, it is uniformly increased by n-times according to the decrease.

The third method is suitable for a case where the reaction resistance-charge amount remarkably changes, and as a result, the reaction resistances of the battery clearly have a dependency on the charge amount.

(Fourth Method)

In a fourth method, regression calculation is performed using data of each active material which is held in advance and is on the diffusion resistance-charge amount, the reaction resistance-charge amount, and the ohmic resistance-charge amount, so that the reaction resistance component, the ohmic resistance component, and the diffusion resistance component are estimated. In the third method, only the diffusion resistance-charge amount and the reaction resistance-charge amount are used. However, in the fourth method, data on the ohmic resistance-charge amount is further used. The fourth method is effective for a case where the dependency of an active material on the ohmic resistance-charge amount is characteristic, for example, a case where the electron conductivity of the active material greatly changes due to charge or discharge.

The input/output performance value calculator 27 calculates the inputtable/outputtable power amount (input/output performance value) on the basis of the calculated battery characteristics, the inner state parameters, and the present battery states such as the voltage and the temperature. As mentioned for the explanation of FIG. 2B, the calculation process of the outputtable power amount is being always performed at intervals approximately from 10 seconds to 30 minutes.

First, the input/output performance value calculator 27 calculates a present chargeable/dischargeable electricity amount (amount of a charge) (Ah) from the present charge amount-OCV curve and battery capacity calculated by the battery characteristic estimator 25, and the present SOC of the storage battery 1 estimated by the SOC estimator 23.

Next, with respect to the calculated chargeable/dischargeable electricity amount (Ah), a current value "Ibest" for using the chargeable/dischargeable electricity amount for a certain fixed period "t" at the maximum without waste is determined. Notably, when, compared with a design current value "Imax" of the storage battery 1, the design current value is smaller than it, "Ibest" is set to be "Imax".

Then, the input/output performance value calculator 27 calculates a voltage drop "ΔV" in discharging (outputting) from the internal resistance "Rcr" after correction and the current value "Ibest". Then, on the basis of the voltage drop "ΔV" and the SOC-OCV curve, an actual inputtable/outputtable power amount (Wh) of the unit cell for the certain fixed period "t" is calculated.

Figure 10:
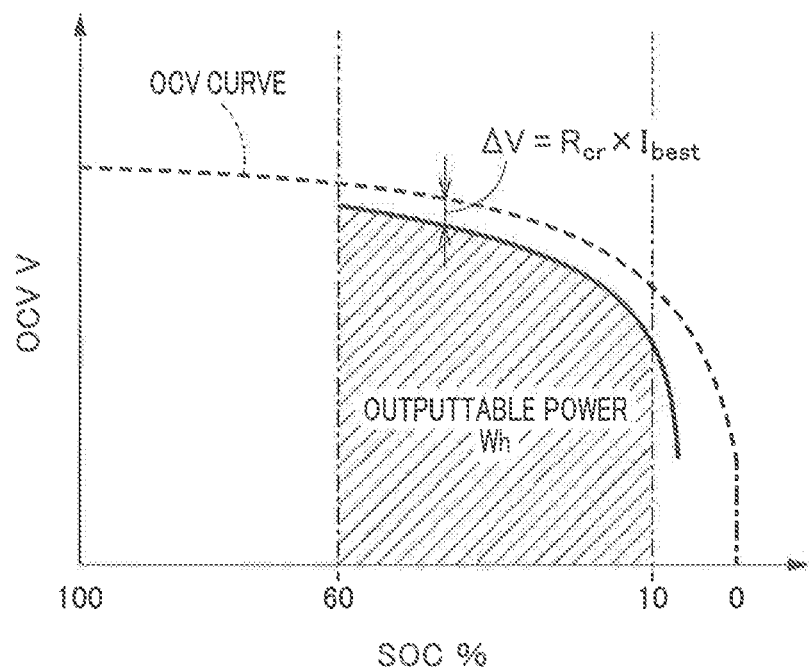
FIG. 10 is a diagram for explaining calculation of an inputtable/outputtable power amount (Wh).

FIG. 10 is a diagram for explaining calculation of the inputtable/outputtable power amount (Wh). The internal resistance after correction at the present temperature of the storage battery 1 is set to "Rcr". It is assumed that the present SOC of the storage battery 1 estimated by the SOC estimator 23 is 60%. Moreover, it is assumed that the present battery capacity calculated by the battery characteristic estimator 25 is 10 Ah.

Since the present battery capacity is 10 Ah and the SOC is 60%, the unit cells currently store a power amount for 6 Ah. Accordingly, the present chargeable/dischargeable electricity amount (Ah) is 4 Ah for charge (input) and 6 Ah for discharge (output). It should be noted that a range of the SOC of the storage battery 1 which can be actually used is often set to approximately 10% to 90% as a result of design for safety and operation. The range of the SOC is herein also 10% to 90%. This means that remaining 1 Ah for 10% cannot be used both for charge and for discharge. Accordingly, a substantial chargeable/dischargeable electricity amount (Ah) is 3 Ah for charge (input), which is 4 Ah minus 1 Ah, and 5 Ah for discharge (output), which is 6 Ah minus 1 Ah.

In this case, there is considered a case of 30-minute output from the storage battery 1 to achieve the 30-minute simultaneous commensuration. A current value "I" for discharging (outputting) the substantially dischargeable electricity amount 5 Ah in 30 minutes is Ibest=10 A from Ibest×0.5 h=5 Ah. According to this, the voltage drop ΔV=Rcr×Ibest in discharging (outputting) is obtained. Further, on the basis of the SOC-OCV curve and the voltage drop "ΔV", an actually outputtable power amount (Wh) (shaded area in FIG. 10) can be calculated. Notably, after discharging the electricity amount of 5 Ah, the SOC becomes 10% since the rest of the electricity amount is 1 Ah.

The calculated input/output performance value is successively reported to the control system 3. Moreover, the report content may include information regarding the input/output performance values of each battery module and each battery package, the internal state of the storage battery 1, and the like, not limited to the input/output performance values of the unit cells.

As above, according to the first embodiment, a power storage system can be realized which highly accurately calculates chargeable/dischargeable capacity and power value in consideration of characteristic variation and deterioration progress of the individual secondary batteries to improve input/output control accuracy of the storage battery 1. Thereby, for example, a power producer and supplier can achieve simultaneous commensuration to prevent occurrence of an "imbalance rate" arising due to a shortage of a supply amount. Furthermore, unexpected charge/discharge stop can be prevented before its happening. Thereby, for example, by charging a storage battery, a problem that the storage battery reaches full charge during absorbing excessively generated power, the charge is stopped, and a surplus power flows into a power line system, which causes a voltage rise or the like, can be prevented from occurring. Therefore, planned management of the storage battery and stabilization of the power line system can be always enabled and deterioration of the storage battery can be suppressed.

Notably, the processing units in the storage battery of the present embodiment can also be realized, for example, by using a general purpose computer device as basic hardware. Namely, by causing a processor mounted on the aforementioned computer device to execute a program, the functions of the individual processing units in this storage battery can be realized. Here, each processing unit can be realized by beforehand installing such a program into the computer device, or by disposing the program in the computer device, which program is stored in a storage medium such as a CD-ROM or distributed via a communication network. Moreover, a memory, a hard disk drive, or a storage medium such as a CD-R, CD-RW, DVD-RAM and DVD-R which is built in or externally attached to the aforementioned computer device can be used.

Moreover, the charge history recorder 251, the active material amount calculator 252, the open circuit voltage calculator 253, the internal resistance corrector 26 and the power amount yielder 27 may be configured of a dedicated integrated circuit or a combination of a calculating device such as a CPU and an MCU and a storing device such as a RAM and a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. The storage battery controlling device comprising:
    a battery characteristic estimator configured to:
        calculate (i) an internal resistance of a secondary battery, and (ii) initial charge amounts and masses of a positive electrode and a negative electrode of the secondary battery, on the basis of data of a temperature, a voltage and a current of the secondary battery, which are measured in charging or discharging the secondary battery; and
        calculate (iii) a function indicating a relationship between an open circuit voltage of the secondary battery and a state of charge or an amount of a charge charged of the secondary battery, on the basis of the calculated initial charge amounts and masses;
    an input/output performance value calculator configured to calculate an inputtable/outputtable power amount of the secondary battery on the basis of the internal resistance and the function calculated by the battery characteristic estimator; and
    an internal resistance corrector configured to calculate an internal resistance at a predetermined reference temperature on the basis of the data of the temperature of the secondary battery and the internal resistance calculated by the battery characteristic estimator, wherein
    the input/output performance value calculator calculates the inputtable/outputtable power amount of the secondary battery at the reference temperature on the basis of the internal resistance at the reference temperature.

2. The storage battery controlling device according to claim 1, wherein the internal resistance corrector calculates three resistance components of a reaction resistance component, an ohmic resistance component and a diffusion resistance component from the internal resistance calculated by the battery characteristic estimator on the basis of a predetermined calculating method, and calculates the internal resistance at the reference temperature by calculating and adding values of the three resistance components at the reference temperature on the basis of transformation expressions respectively predetermined for the three resistance components.

3. The storage battery controlling device according to claim 2, wherein
the internal resistance corrector calculates the three resistance components by regarding the ohmic resistance component and the diffusion resistance component as fixed values, and setting a difference between the internal resistance calculated by the battery characteristic estimator and a sum of the reaction resistance component and the diffusion resistance component to the reaction resistance component.

4. The storage battery controlling device according to claim 2, wherein
the internal resistance corrector calculates the three resistance components by estimating the ohmic resistance component and the diffusion resistance component on the basis of an accumulated time or an accumulated power amount regarding charge and discharge of the secondary battery, and setting a difference between the internal resistance calculated by the battery characteristic estimator and a sum of the ohmic resistance component and the diffusion resistance component to the reaction resistance component.

5. The storage battery controlling device according to claim 2, wherein
the internal resistance corrector calculates the reaction resistance component and the diffusion resistance component by beforehand holding first relationship data indicating relationship between a reaction resistance and a charge amount, and second relationship data indicating relationship between a diffusion resistance and the charge amount, and performing regression calculation on the basis of the first and second relationship data, and calculates the three resistance components by setting a difference between the internal resistance calculated by the battery characteristic estimator and a sum of the reaction resistance component and the diffusion resistance component to the ohmic resistance component.

6. The storage battery controlling device according to claim 2, wherein
the internal resistance corrector calculates the three resistance components by beforehand holding first relationship data indicating relationship between a reaction resistance and a charge amount, second relationship data indicating relationship between an ohmic resistance and the charge amount, and third relationship data indicating relationship between a diffusion resistance and the charge amount, and performing regression calculation on the basis of the first to third relationship data.

7. A controlling method by which a computer executes:
calculating an internal resistance of a secondary battery;
calculating initial charge amounts and masses of a positive electrode and a negative electrode of the secondary battery, on the basis of data of a temperature, a voltage and a current of the secondary battery, which are measured in charging or discharging the secondary battery;
calculating a function indicating a relationship between an open circuit voltage of the secondary battery and a state of charge or an amount of a charge charged of the secondary battery, on the basis of the calculated initial charge amounts and masses;
calculating an inputtable/outputtable power amount of the secondary battery on the basis of the internal resistance and the function; and
calculating an internal resistance at a predetermined reference temperature on the basis of the data of the temperature of the secondary battery and the calculated internal resistance, wherein
the inputtable/outputtable power amount of the secondary battery is calculated at the reference temperature on the basis of the internal resistance at the reference temperature.

8. A non-transitory computer readable medium having a computer program stored therein which causes a computer when executed by the computer, to perform processes comprising:
calculating an internal resistance of a secondary battery;
calculating initial charge amounts and masses of a positive electrode and a negative electrode of the secondary battery, on the basis of data of a temperature, a voltage and a current of the secondary battery, which are measured in charging or discharging the secondary battery;
calculating a function indicating a relationship between an open circuit voltage of the secondary battery and a state of charge or an amount of a charge charged of the secondary battery, on the basis of the calculated initial charge amounts and masses;
calculating an inputtable/outputtable power amount of the secondary battery on the basis of the internal resistance and the function; and
calculating an internal resistance at a predetermined reference temperature on the basis of the data of the temperature of the secondary battery and the calculated internal resistance, wherein
the inputtable/outputtable power amount of the secondary battery is calculated at the reference temperature on the basis of the internal resistance at the reference temperature.

9. A power storage system comprising: a storage battery; a storage battery controlling device; and a control system, wherein:
the storage battery includes s one or more secondary batteries and performs charge or discharge under a predetermined condition for every fixed period,
the storage battery controlling device includes:
a battery characteristic estimator configured to:
calculate (i) an internal resistance of the secondary battery, and (ii) initial charge amounts and masses of a positive electrode and a negative electrode of the secondary battery, on the basis of data of a temperature, a voltage and a current of the secondary battery which are measured in charging or discharging the secondary battery, and
calculate (iii) a function indicating a relationship between an open circuit voltage of the secondary battery and a state of charge or an amount of a charge charged of the secondary battery, on the basis of the calculated initial charge amounts and masses; and an input/output performance value calculator configured to calculate an inputtable/outputtable power amount of the secondary battery on the basis of the internal resistance and the function calculated by the battery characteristic estimator, and an internal resistance corrector configured to calculate an internal resistance at a predetermined reference temperature on the basis of the data of the temperature of the secondary battery and the internal resistance calculated by the battery characteristic estimator, wherein:

the storage battery controlling device reports each of the inputtable/outputtable power amounts of the secondary batteries in the storage battery to the control system, the control system generates an instruction of charge/discharge with respect to the storage battery on the basis of each of the inputtable/outputtable power amounts of the secondary batteries in the storage battery, and reports the instruction to the storage battery controlling device or the storage battery, and the input/output performance value calculator calculates the inputtable/outputtable power amount of the secondary battery at the reference temperature on the basis of the internal resistance at the reference temperature.

10. A power system comprising: a storage battery; a storage battery controlling device; a control system; and a power generating system or a power line system or both of these, wherein:

the storage battery includes one or more secondary batteries and performs charge or discharge under a predetermined condition for every fixed period, the storage battery controlling device includes:
 a battery characteristic estimator configured to:
  calculate (i) an internal resistance of the secondary battery, and (ii) initial charge amounts and masses of a positive electrode and a negative electrode of the secondary battery, on the basis of data of a temperature, a voltage and a current of the secondary battery which are measured in charging or discharging the secondary battery, and
  calculate (iii) a function indicating a relationship between an open circuit voltage of the secondary battery and a state of charge or an amount of a charge charged of the secondary battery, on the basis of the calculated initial charge amounts and masses;

an input/output performance value calculator configured to calculate an inputtable/outputtable power amount of the secondary battery on the basis of the internal resistance and the function calculated by the battery characteristic estimator, and an internal resistance corrector configured to calculate an internal resistance at a predetermined reference temperature on the basis of the data of the temperature of the secondary battery and the internal resistance calculated by the battery characteristic estimator, wherein:

the storage battery controlling device reports each of the inputtable/outputtable power amounts of the secondary batteries in the storage battery to the control system, and the control system determines an input/output amount of power with respect to the power generating system or the power line system or both of these on the basis of each of the inputtable/outputtable power amounts of the secondary batteries in the storage battery, generates an instruction of charge/discharge with respect to the storage battery, and reports the instruction to the storage battery controlling device or the storage battery, and the input/output performance value calculator calculates the inputtable/outputtable power amount of the secondary battery at the reference temperature on the basis of the internal resistance at the reference temperature.

* * * * *